United States Patent
Nudo

(10) Patent No.: US 10,251,512 B2
(45) Date of Patent: Apr. 9, 2019

(54) PORTABLE WARMING DEVICE

(71) Applicant: Frank Nudo, San Ramon, CA (US)

(72) Inventor: Frank Nudo, San Ramon, CA (US)

( * ) Notice: Subject to any disclaimer, the term of this patent is extended or adjusted under 35 U.S.C. 154(b) by 204 days.

(21) Appl. No.: 15/336,299

(22) Filed: Oct. 27, 2016

(65) Prior Publication Data

US 2018/0116449 A1 May 3, 2018

(51) Int. Cl.
*A47J 36/24* (2006.01)

(52) U.S. Cl.
CPC .................. *A47J 36/2483* (2013.01)

(58) Field of Classification Search
CPC ....... A47J 36/2483; A47J 39/02; H05B 3/686; H05B 3/30
USPC ............. 99/483, 663, 512; 392/349
See application file for complete search history.

(56) References Cited

U.S. PATENT DOCUMENTS

| | | | | |
|---|---|---|---|---|
| 3,105,138 A * | 9/1963 | Gazdik | ............... | A47J 36/2483 219/386 |
| 3,875,370 A * | 4/1975 | Williams | ............... | A47J 27/004 126/246 |
| 4,435,638 A * | 3/1984 | Simon | ............... | H05B 3/76 126/39 E |
| 4,757,183 A * | 7/1988 | Karey | ............... | A45D 20/10 219/543 |
| 4,763,568 A * | 8/1988 | Kiczek | ............... | A23L 7/187 219/400 |
| 4,827,107 A * | 5/1989 | Peery | ............... | A47J 27/004 219/386 |
| D334,108 S * | 3/1993 | Fisher | ............... | D7/323 |
| 7,193,190 B2 * | 3/2007 | Kissel, Jr. | ............... | A47J 36/2483 219/386 |
| 8,541,719 B2 * | 9/2013 | Steurer | ............... | H02J 3/14 219/414 |
| 2008/0023463 A1 * | 1/2008 | Labelle | ............... | A47J 27/21175 219/438 |
| 2009/0186139 A1 * | 7/2009 | Dragan | ............... | A23L 1/0121 426/510 |
| 2009/0194522 A1 * | 8/2009 | Connolly | ............... | A47J 27/004 219/521 |
| 2009/0252842 A1 * | 10/2009 | Wang | ............... | A23L 3/32 426/231 |
| 2010/0126695 A1 * | 5/2010 | Gara | ............... | F25D 31/007 165/58 |
| 2011/0253693 A1 * | 10/2011 | Lyons | ............... | A47J 27/00 219/209 |
| 2012/0174797 A1 * | 7/2012 | Froza | ............... | A47J 27/0802 99/325 |
| 2013/0112089 A1 * | 5/2013 | Raio | ............... | A47J 37/067 99/422 |
| 2014/0157998 A1 * | 6/2014 | Roever | ............... | H05B 6/1245 99/483 |

(Continued)

FOREIGN PATENT DOCUMENTS

WO  WO2014107590  7/2014

*Primary Examiner* — Jimmy Chou

(57) ABSTRACT

A portable warming device for maintaining food items in a warm state includes a housing that defines an internal space. A power module and a heating element are coupled to the housing and are positioned in the internal space. The heating element is operationally coupled to the power module. The heating element is positioned in the housing such that the heating element is configured to warm items that are positioned in contact with the housing.

6 Claims, 5 Drawing Sheets

(56) References Cited

U.S. PATENT DOCUMENTS

| | | | |
|---|---|---|---|
| 2014/0318382 A1* | 10/2014 | Hornbeck | A47J 37/0857 |
| | | | 99/332 |
| 2015/0335202 A1* | 11/2015 | Wisner | A47J 39/02 |
| | | | 392/346 |
| 2016/0015209 A1* | 1/2016 | Dunn | A47J 36/2438 |
| | | | 99/483 |
| 2016/0022094 A1* | 1/2016 | Dunlap | A47J 39/00 |
| | | | 99/483 |
| 2016/0066744 A1* | 3/2016 | Baxi | A47J 36/32 |
| | | | 99/343 |
| 2016/0183730 A1* | 6/2016 | Bedi | A47G 19/2288 |
| | | | 219/439 |

* cited by examiner

PORTABLE WARMING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to portable warming devices and more particularly pertains to a new portable warming device for maintaining food items in a warm state.

BRIEF SUMMARY OF THE INVENTION

An embodiment of the disclosure meets the needs presented above by generally comprising a housing that defines an internal space. A power module and a heating element are coupled to the housing and are positioned in the internal space. The heating element is operationally coupled to the power module. The heating element is positioned in the housing such that the heating element is configured to warm items that are positioned in contact with the housing.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
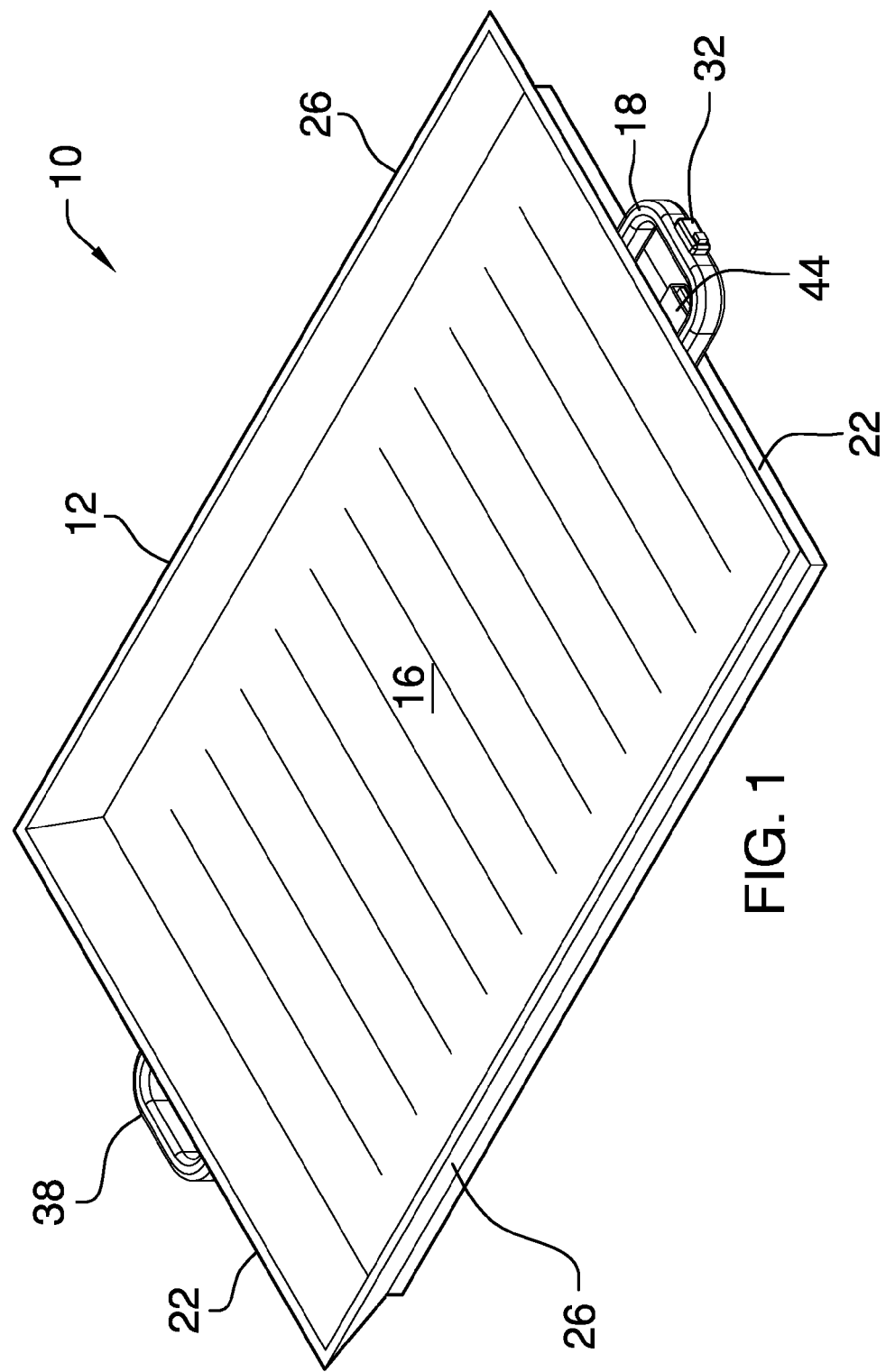
FIG. 1 is an isometric perspective view of a portable warming device according to an embodiment of the disclosure.
Figure 2:
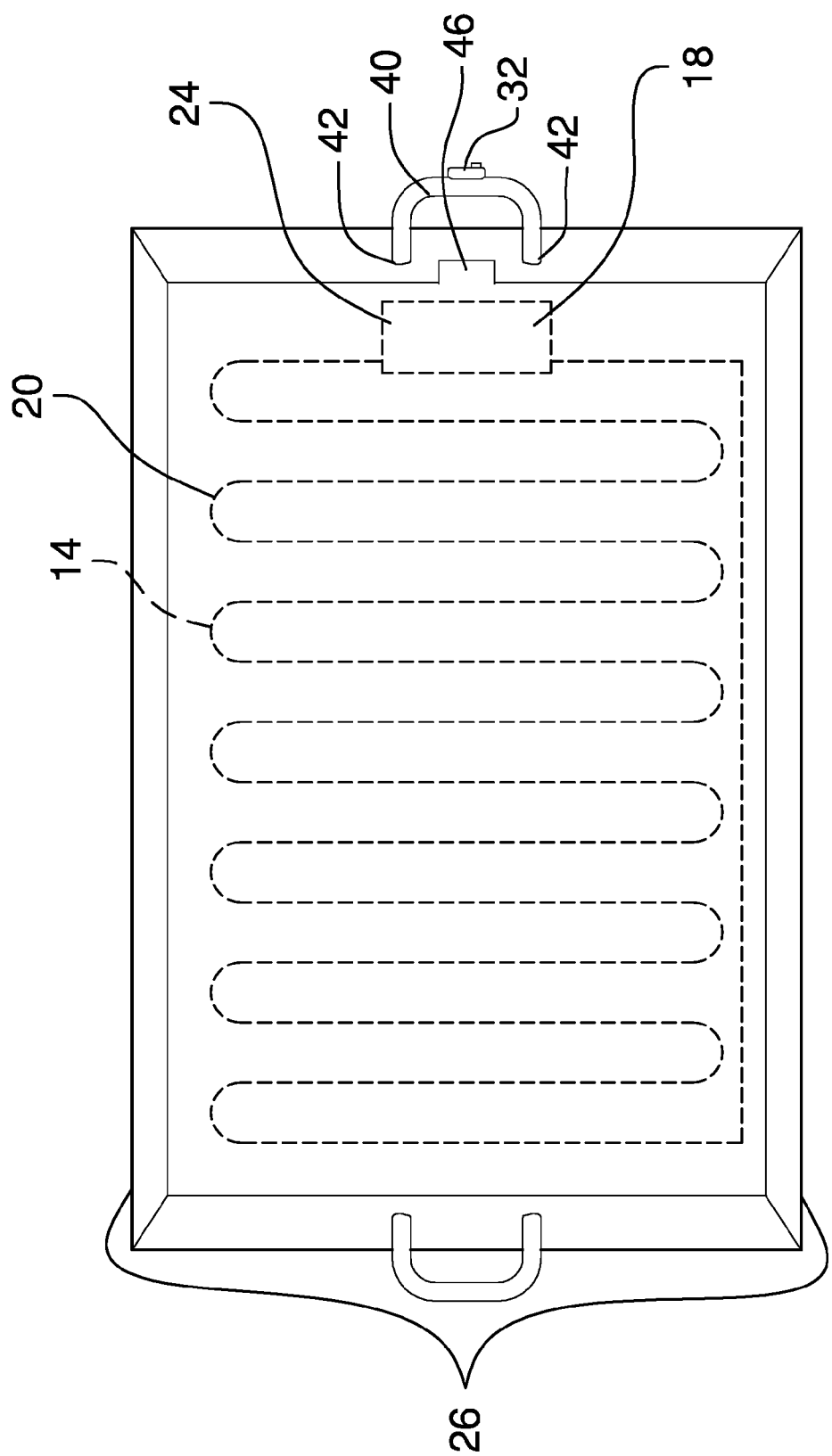
FIG. 2 is a bottom view of an embodiment of the disclosure.
Figure 3:
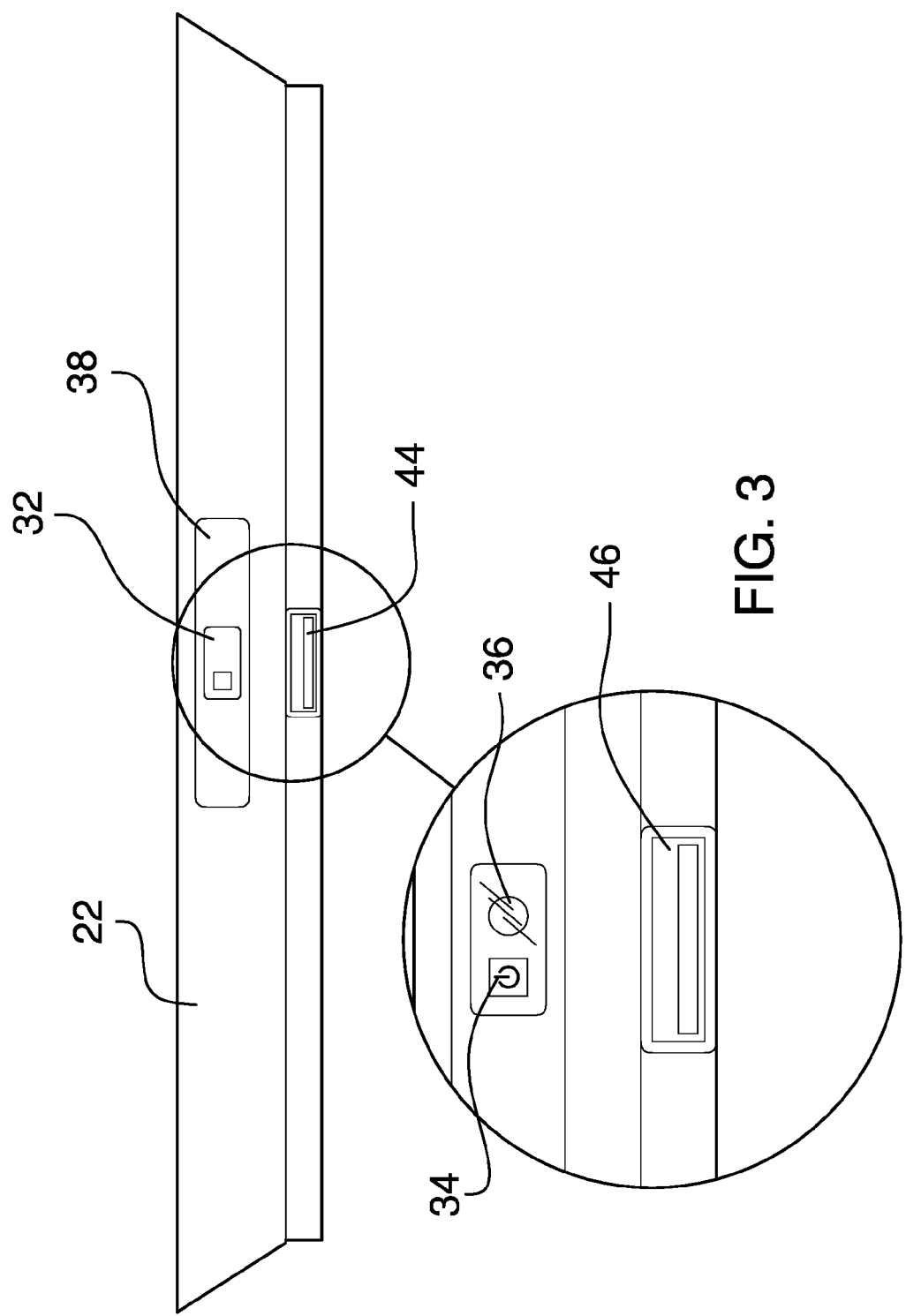
FIG. 3 is an end view of an embodiment of the disclosure.
Figure 4:
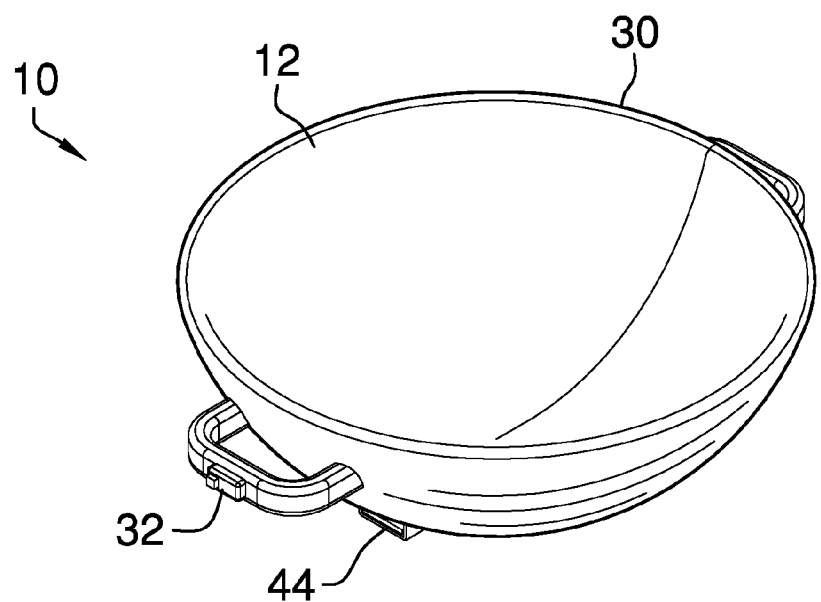
FIG. 4 is an isometric perspective view of an embodiment of the disclosure.
Figure 5:
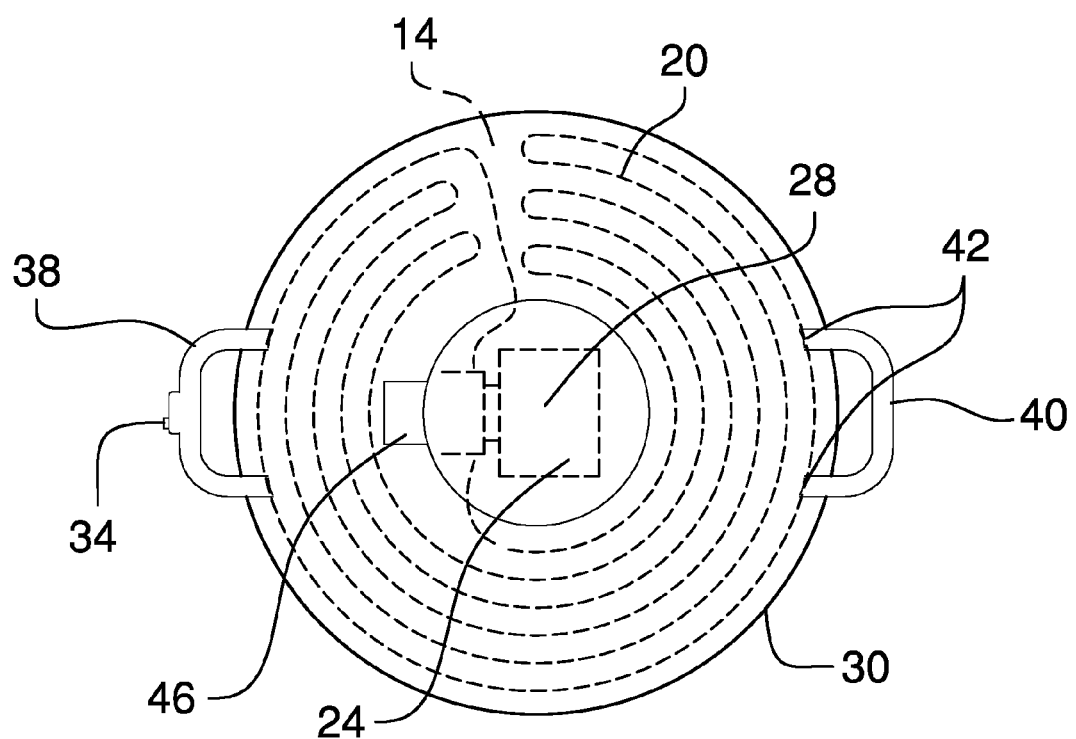
FIG. 5 is a bottom view of an embodiment of the disclosure.
Figure 6:
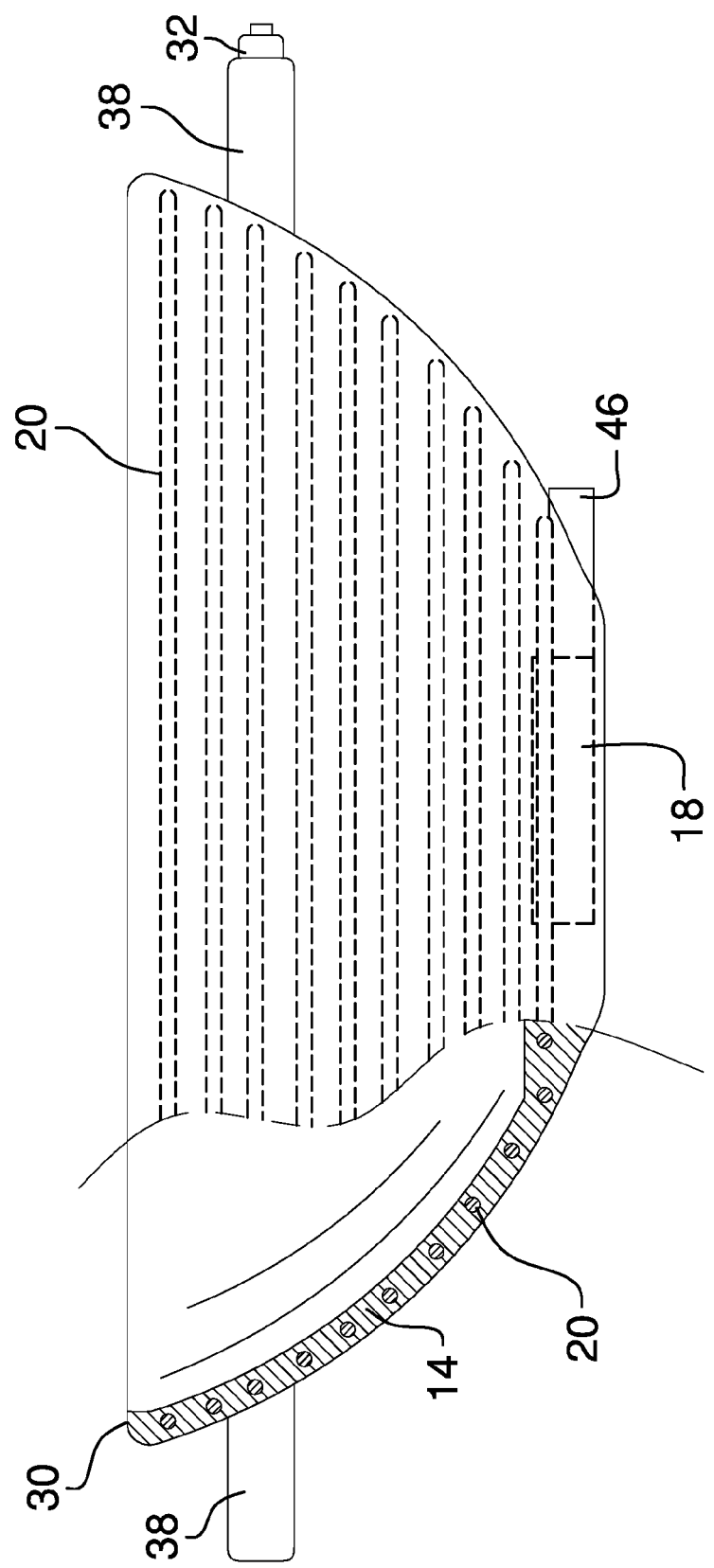
FIG. 6 is a cross-sectional view of an embodiment of the disclosure.

With reference now to the drawings, and in particular to FIGS. 1 through 6 thereof, a new portable warming device embodying the principles and concepts of an embodiment of the disclosure and generally designated by the reference numeral 10 will be described.

As best illustrated in FIGS. 1 through 6, the portable warming device 10 generally comprises a housing 12 that defines an internal space 14. In one embodiment, the housing 12 is bowl shaped. In another embodiment, the housing 12 is tray shaped. The housing 12 has an upper surface 16. In one embodiment, the upper surface 16 is non-stick.

A power module 18 and a heating element 20 are coupled to the housing 12 and are positioned in the internal space 14. In one embodiment, the power module 18 is positioned proximate to a respective opposing end 22 of the housing 12. In another embodiment, the power module 18 is substantially centrally positioned in the housing 12. In yet another embodiment, the power module 18 comprises at least one battery 24. In still yet another embodiment, the at least one battery 24 is rechargeable.

The heating element 20 is operationally coupled to the power module 18. The heating element 20 is positioned in the housing 12 such that the heating element 20 is configured to warm items that are positioned in contact with the housing 12. In one embodiment, the heating element 20 extends loopedly between opposing sides 26 of the housing 12. In another embodiment, the heating element 20 extends loopedly between a center 28 and an upper rim 30 of the housing 12.

A controller 32 is coupled to the housing 12. The controller 32 is operationally coupled to the power module 18 and the heating element 20. The controller 32 is positioned on the housing 12 such that the controller 32 is positioned to selectively couple the power module 18 to the heating element 20. In one embodiment, the controller 32 comprises a button 34. The button 34 is depressible to couple the power module 18 to the heating element 20. In another embodiment, the controller 32 comprises a light 36. The light 36 is configured to illuminate when the button 34 is depressed. The light 36 is positioned to indicate coupling of the power module 18 to the heating element 20. It is anticipated that the controller 32 comprises high and low settings. It also is anticipated that controller 32 comprises a potentiometer.

A plurality of handles 38 is coupled to and extends from the housing 12. The handles 38 are positioned on the housing 12 such that the handles 38 are configured to be grasped in a hand of a user to lift the housing 12. In one embodiment, the plurality of handles 38 comprises two handles 38. The handles 38 are opposingly positioned on the housing 12. In another embodiment, each handle 38 comprises a bar 40 having opposing endpoints 42. Each opposing endpoint 42 is coupled to the housing 12. In one embodiment, the bar 40 is substantially C-shaped. In still yet another embodiment, the controller 32 is positioned in a respective handle 38.

A coupler 44 is coupled to the housing 12. The coupler 44 is operationally coupled to the at least one battery 24. The coupler 44 is configured to couple to an electrical source. The coupler 44 is positioned on the housing 12 such that the coupler 44 is configured to couple the at least one battery 24 to the electrical source to recharge the at least one battery 24. In one embodiment, the coupler 44 comprises a universal serial bus receptacle 46. The present invention also anticipates the coupler 44 comprising a port for an AC adapter.

In use, the handles 38 are configured to be grasped in a hand of a user to lift the housing 12. The coupler 44 is configured to couple the at least one battery 24 to the electrical source to recharge the at least one battery 24. The controller 32 is positioned to selectively couple the power module 18 to the heating element 20. The light 36 is positioned to indicate coupling of the power module 18 to the heating element 20. The heating element 20 is configured to warm items that positioned in contact with the housing 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A portable warming device comprising:
    a housing defining an internal space, said housing having an upper surface, said upper surface being non-stick, said housing being bowl shaped;
    a power module coupled to said housing and positioned in said internal space, said power module being substantially centrally positioned in said housing, said power module comprising at least one battery, said at least one battery being rechargeable;
    a heating element coupled to said housing and positioned in said internal space, said heating element being operationally coupled to said power module, said heating element extending loopedly between a center and an upper rim of said housing;
    a controller coupled to said housing, said controller being operationally coupled to said power module and said heating element, wherein said controller is positioned on said housing such that said controller is positioned for selectively coupling said power module to said heating element, said controller comprising
        a button, said button being depressible to couple said power module to said heating element,
        a light, said light being configured to illuminate when said button is depressed such that said light is positioned to indicate coupling of said power module to said heating element;
    a plurality of handles coupled to and extending from said housing, wherein said handles are positioned on said housing such that said handles are configured for grasping in a hand of a user, such that said housing is liftable, said controller being positioned in a respective said handle;
    a coupler coupled to said housing, said coupler being operationally coupled to said at least one battery, said coupler being configured for coupling to an electrical source, wherein said coupler is positioned on said housing such that said coupler is configured to couple said at least one battery to the electrical source such that said at least one battery is recharged; and
    wherein said heating element is positioned in said housing such that said heating element is configured for warming items positioned in contact with said housing.

2. The portable warming device of claim 1, further including said plurality of handles comprising two said handles, said handles being opposingly positioned on said housing.

3. The portable warming device of claim 1, further including each said handle comprising a bar having opposing endpoints, each said opposing endpoint being coupled to said housing.

4. The portable warming device of claim 3, further including said bar being substantially C-shaped.

5. The portable warming device of claim 1, further including said coupler comprising a universal serial bus receptacle.

6. A portable warming device comprising:
    a housing defining an internal space, said housing being tray shaped, said housing having an upper surface, said upper surface being non-stick;
    a power module coupled to said housing and positioned in said internal space, said power module comprising at least one battery, said power module being positioned proximate to a respective opposing end of said housing, said power module being substantially centrally positioned in said housing, said at least one battery being rechargeable;
    a heating element coupled to said housing and positioned in said internal space, said heating element being operationally coupled to said power module, wherein said heating element is positioned in said housing such that said heating element is configured for warming items positioned in contact with said housing, said heating element extending loopedly between opposing sides of said housing, said heating element extending loopedly between a center and an upper rim of said housing;
    a controller coupled to said housing, said controller being operationally coupled to said power module and said heating element, wherein said controller is positioned on said housing such that said controller is positioned for selectively coupling said power module to said heating element, said controller comprising a button, said button being depressible to couple said power module to said heating element, said controller comprising a light, said light being configured to illuminate when said button is depressed such that said light is positioned to indicate coupling of said power module to said heating element;
- a plurality of handles coupled to and extending from said housing, wherein said handles are positioned on said housing such that said handles are configured for grasping in a hand of a user, such that said housing is liftable, said plurality of handles comprising two said handles, said handles being opposingly positioned on said housing, each said handle comprising a bar having opposing endpoints, each said opposing endpoint being coupled to said housing, said bar being substantially C-shaped, said controller being positioned in a respective said handle;
- a coupler coupled to said housing, said coupler being operationally coupled to said at least one battery, said coupler being configured for coupling to an electrical source, wherein said coupler is positioned on said housing such that said coupler is configured to couple said at least one battery to the electrical source such that said at least one battery is recharged, said coupler comprising a universal serial bus receptacle; and
- wherein said handles are positioned on said housing such that said handles are configured for grasping in a hand of a user, such that said housing is liftable, wherein said coupler is positioned on said housing such that said coupler is configured to couple said at least one battery to the electrical source such that said at least one battery is recharged, wherein said controller is positioned on said housing such that said controller is positioned for selectively coupling said power module to said heating element, wherein said light is positioned to indicate coupling of said power module to said heating element, wherein said heating element is positioned in said housing such that said heating element is configured for warming items positioned in contact with said housing.

* * * * *